United States Patent
Kotecha

(10) Patent No.: US 9,854,487 B2
(45) Date of Patent: Dec. 26, 2017

(54) SIMPLIFIED CALL CONTINUITY

(71) Applicant: Verizon Patent and Licensing Inc., Arlington, VA (US)

(72) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 65 days.

(21) Appl. No.: 14/158,118

(22) Filed: Jan. 17, 2014

(65) Prior Publication Data

US 2015/0208306 A1 Jul. 23, 2015

(51) Int. Cl.
*H04W 36/14* (2009.01)
*H04W 36/18* (2009.01)
*H04W 76/02* (2009.01)

(52) U.S. Cl.
CPC ........... *H04W 36/14* (2013.01); *H04W 36/18* (2013.01); *H04W 76/026* (2013.01); *H04W 76/021* (2013.01)

(58) Field of Classification Search
CPC ... H04W 36/14; H04W 36/18; H04W 76/026; H04W 76/021
See application file for complete search history.

(56) References Cited

U.S. PATENT DOCUMENTS

| | | | | |
|---|---|---|---|---|
| 8,116,776 B1* | 2/2012 | Jagadeesan | ........... | H04W 36/00 370/331 |
| 2006/0258358 A1* | 11/2006 | Kallio | ........................... | 455/437 |
| 2006/0270447 A1* | 11/2006 | Everson | ............ | H04L 29/06027 455/552.1 |
| 2013/0244673 A1* | 9/2013 | Anand | .................. | H04W 24/02 455/450 |
| 2014/0079022 A1* | 3/2014 | Wang | .................... | H04W 36/22 370/331 |
| 2015/0005033 A1* | 1/2015 | Petersson | .............. | H04W 8/205 455/558 |

OTHER PUBLICATIONS

"Digital Cellular Telecommunications System (Phase 2+); Universal Mobile Telecommunications System (UMTS); LTE; Single Radio Voice Call Continuity (SRVCC); Stage 2 (3GPP TS 23.215 Version 11.10.0 Release 11)," European Telecommunications Standards Institute ("ETSI") Technical Specification ("TS") 123 216 V11.10.0, Dec. 2013.

* cited by examiner

*Primary Examiner* — Marcos Torres

(57) ABSTRACT

A server device may identify an ongoing call associated with a received handover call. The handover call may have been placed via a first network, and the ongoing call may be associated with a second network. The server device may detect that the user device has performed a handover of the ongoing call from the second network to the first network; and may process the ongoing call via the first network based on the detecting. A user device may establish a first call via a first network; detect a handover condition associated with the first network; place, based on detecting the handover condition, a second call via a second network, the second call being placed while the first call is in progress; receive an instruction to perform a handover; and send and receive, based on receiving the instruction to perform the handover, call traffic via the second call.

22 Claims, 13 Drawing Sheets

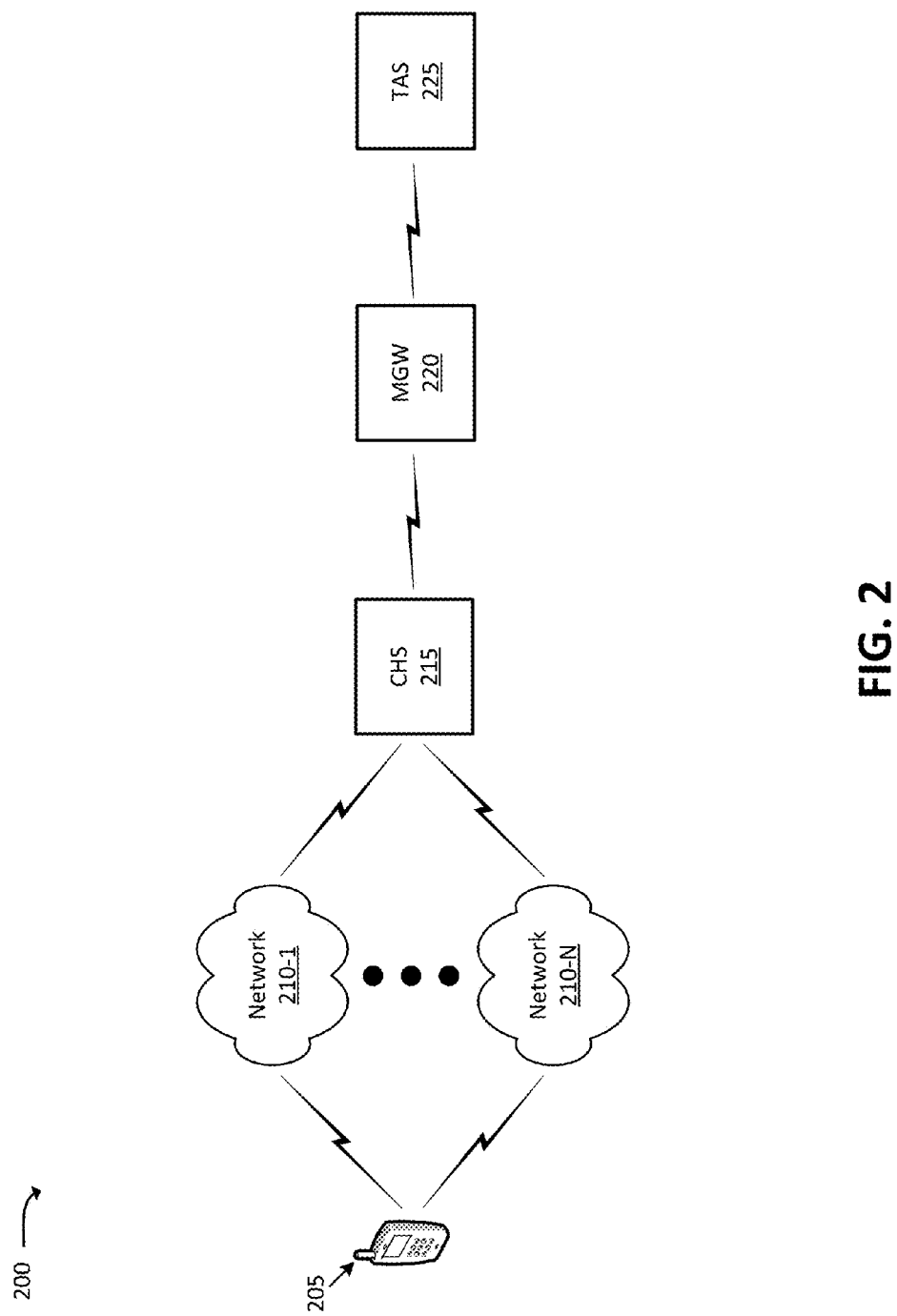

SIMPLIFIED CALL CONTINUITY

BACKGROUND

Wireless networks, such as cellular telecommunications networks, may provide connectivity to user devices, such as cellular telephones, in order to enable the user devices to place calls. As wireless technology evolves, different types of wireless networks may be available to user devices to place calls. For example, user devices may be able to access Code Division Multiple Access 2000 ("CDMA") 1× networks, Long Term Evolution ("LTE") networks, "Wi-Fi" networks, and/or other types of networks. In some situations, a particular user device may be in range of multiple different types of networks during an active call, and a handover of the call from one network to another may be desirable.

BRIEF DESCRIPTION OF THE DRAWINGS

FIGS. 2-4 illustrate example environments in which systems and/or methods, described herein, may be implemented;

DETAILED DESCRIPTION OF PREFERRED EMBODIMENTS

The following detailed description refers to the accompanying drawings. The same reference numbers in different drawings may identify the same or similar elements.

Techniques described herein may allow for the handover of active calls from one wireless network to another. The techniques described herein may be simplified, as compared to other existing techniques (e.g., as described in the document, "Digital Cellular Telecommunications System (Phase 2+); Universal Mobile Telecommunications System (UMTS); LTE; Single Radio Voice Call Continuity (SRVCC); Stage 2 (3GPP TS 23.215 Version 11.10.0 Release 11)," European Telecommunications Standards Institute ("ETSI") Technical Specification ("TS") 123 216 V11.10.0, December 2013). For example, in order to implement such existing techniques, numerous modifications to existing systems may be required, including modifications to user devices, radio access networks ("RANs"), and other networks. Some implementations described herein may allow call handovers to be performed, without requiring such modifications.

Figure 1A:
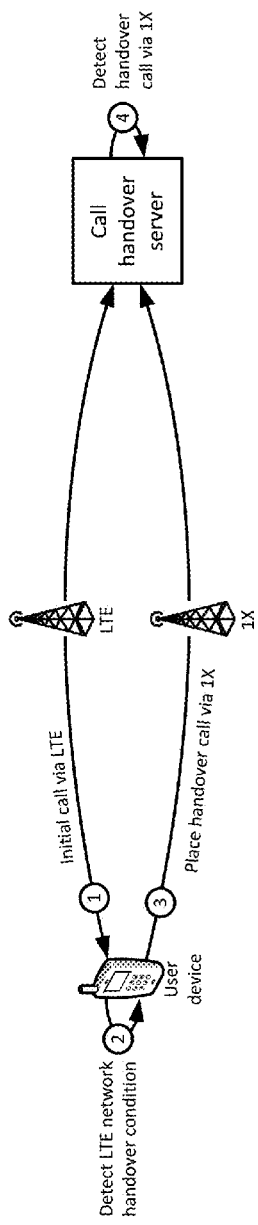
FIGS. 1A and 1B illustrate an example overview of one or more implementations described herein.
Figure 1B:
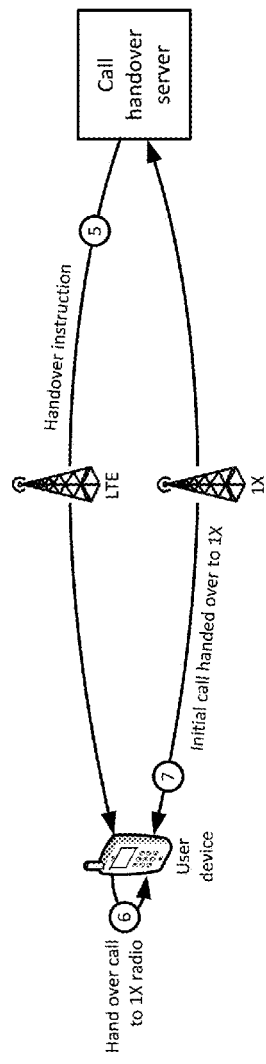

FIGS. 1A and 1B illustrate an example overview of some implementations described herein. In the example shown in FIGS. 1A and 1B, assume that the user device, illustrated in these figures, is capable of communicating with multiple wireless networks, such as an LTE network and a CDMA2000 1× network (hereinafter referred to simply as "1× network"). Further assume that the user device is capable of simultaneously conducting multiple calls (e.g., conducting one call via the LTE network and another simultaneous call via the 1× network). Further, in some implementations, the user device may be capable of simultaneously sending and/or receiving voice and/or data via a particular network (e.g., simultaneously maintaining a voice connection and a data connection via the LTE network).

As shown in FIG. 1A, the user device may be engaged in an active call (arrow "1"), via an LTE network. As shown, a call handover server may send and receive call traffic to and from the user device. The call handover server may forward the call traffic to and from one or more other networks and/or devices, such as an Internet Protocol ("IP") Multimedia Subsystem ("IMS") network. During the call, the user device may detect a handover condition in the LTE network (arrow "2"). For example, the user device may detect a high signal-to-noise ratio between the user device and the LTE network, a high latency of traffic between the user device and the LTE network, a low throughput of traffic between the user device and the LTE network, or the like.

Based on detecting the handover condition, the user device may place a handover call, to a telephone number associated with handovers, via the 1× network (arrow "3"). As shown, the call handover server may detect that the handover call was placed via the 1× network (arrow "4"). For example, as described below, the call handover server may detect the handover call based on the dedicated telephone number being used, based on a call identifier included in the handover call, and/or using another technique.

As shown in FIG. 1B, based on detecting the placement of the handover call, the call handover server may provide a handover instruction to the user device (arrow "5"). Based on receiving the handover instruction, the user device may hand the call over to a 1× radio associated with the user device (arrow "6"). For example, while the call may have initially been conducted via an LTE radio associated with the user device (e.g., voice data received by a microphone of the user device may have been outputted via the LTE radio at arrow "1"), the call may be conducted via the 1× radio upon the handover performed at arrow "6." Once the call has been handed over, the call may be conducted between the user device and the call handover server, via the 1× network (arrow "7").

Performing a handover of a call based on detecting a handover condition (e.g., a degrading network signal) may provide an enhanced user experience, in that calls may be dropped less frequently, and/or call quality may improve. By placing a simultaneous call to facilitate the handover, the likelihood of call interruption may be reduced. Furthermore, as mentioned above, the techniques described herein may require less modification of existing systems than other handover techniques.

FIG. 2 illustrates an example environment 200, in which systems and/or methods described herein may be implemented. As shown in FIG. 2, environment 200 may include user device 205, networks 210-1 through 210-N (hereinafter sometimes referred to collectively as "networks 210" or individually as "network 210," where N is an integer greater than 1), call handover server ("CHS") 215, media gateway ("MGW") 220, and telephony application server ("TAS") 225.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. More detailed views of portions of environment 200, in accordance with some implementations, are described below with reference to FIGS. 3 and 4.

User device 205 may include any computation and communication device, such as a wireless mobile communication device that is capable of communicating with one or more networks (e.g., networks 210). For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a set-top device ("STD"), a personal gaming system, and/or another type of mobile computation and communication device.

In some implementations, user device 205 may be capable of simultaneously communicating with two or more networks 210. Additionally, or alternatively, user device 205 may be capable of simultaneously sending and/or receiving both voice and data via a particular network 210. As described below, user device 205 may include hardware and/or software that allow user device 205 to detect handover conditions (e.g., signal-to-noise ratio, packet loss, packet jitter, etc.) in one or more networks 210. As also described below, user device 205 may seamlessly perform handovers of active calls from one network 210 to another (e.g., based on the detection of a handover condition).

Network 210 may include a wireless RAN, a backhaul network, and/or another type of network. Network 210 may receive traffic from user device 205 and/or CHS 215, and may forward the traffic appropriately. For example, network 210 may receive call traffic from user device 205, and may forward the received call traffic to CHS 215. Similarly, network 210 may receive call traffic from CHS 215, and may forward the received call traffic to user device 205.

CHS 215 may include a server device, or a collection of server devices, that process and forward data. As described in greater detail herein, CHS 215 may facilitate the handover of calls from one network 210 to another, as described in greater detail herein. As also described below, CHS 215 may be communicatively coupled to, or may be incorporated in, an IMS network.

MGW 220 may include a server device, or a collection of server devices, that process and forward data. For example, MGW 220 may receive call data from CHS 215, and may transcode the call data from one protocol to another protocol (e.g., from Signaling System 7 ("SS7") protocol to Session Initiation Protocol ("SIP"), and/or vice versa). In some implementations, MGW 220 may be communicatively coupled to, or may be incorporated in, an IMS network. Further, in some implementations, CHS 215 and MGW 220 may be incorporated in the same device or collection of devices.

TAS 225 may include a server device, or a collection of server devices, that process and forward data. For example, TAS 225 may perform telephony-related services, such as call setup and handling, presence, address book services, charging, and/or other services. In some implementations, TAS 225 may be communicatively coupled to, or may be incorporated in, an IMS network.

Figure 3:
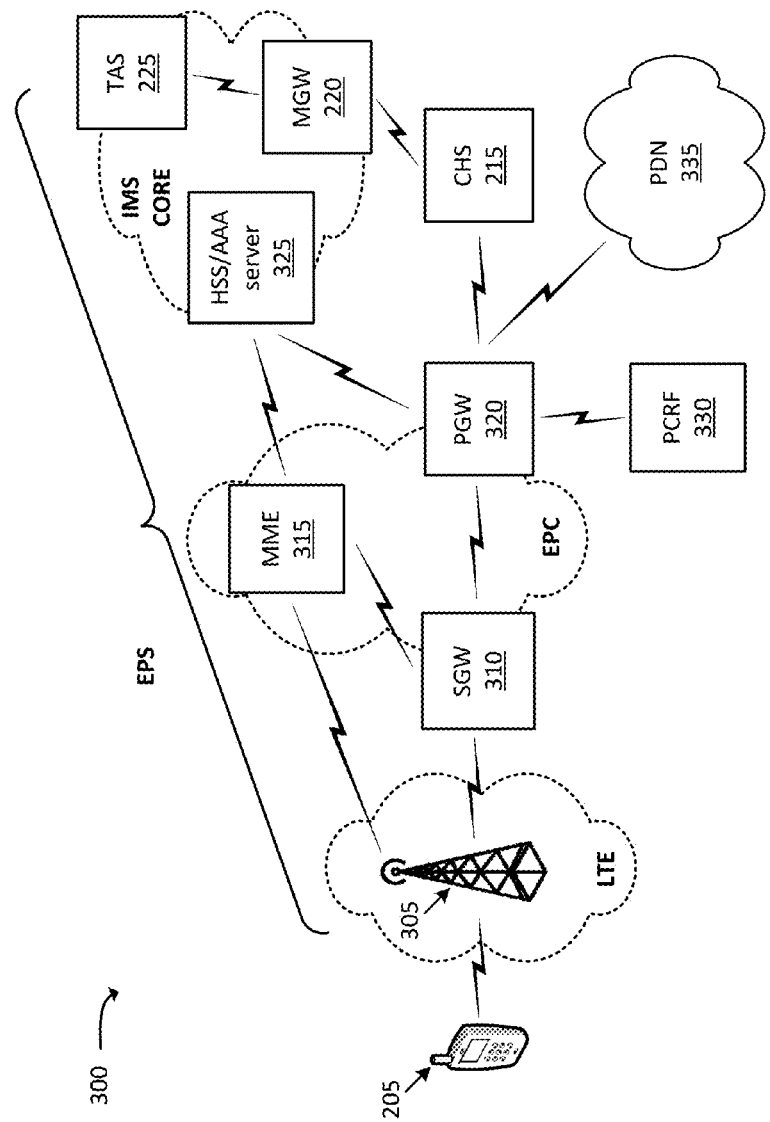

FIG. 3 illustrates environment 300, in which systems and/or methods described herein may be implemented. As mentioned above, some portions of environment 300 may be the same as, or similar to, portions of environment 200. Further, as described below, some portions of environment 300 may be more detailed representations of portions of environment 200.

As shown in FIG. 3, environment 300 may include user device 205, CHS 215, MGW 220, TAS 225, base station 305, serving gateway ("SGW") 310, mobility management entity device ("MME") 315, packet data network ("PDN") gateway ("PGW") 320, home subscriber server ("HSS")/authentication, authorization, accounting ("AAA") server (hereinafter referred to as "HSS/AAA server") 325, policy charging and rules function ("PCRF") 330, and PDN 335.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environments 300.

Environment 300 may include an evolved packet system ("EPS") that includes an LTE network and/or an evolved packet core ("EPC") network that operate based on a third generation partnership project ("3GPP") wireless communication standard. The LTE network may be, or may include, a RAN that includes one or more base stations 305, some or all of which may take the form of an eNodeB ("eNB"), via which user device 205 may communicate with the EPC network. The EPC network may include one or more SGWs 310, MMEs 315, and/or PGWs 320, and may enable user device 205 to communicate with PDN 335 and/or an IMS core network. The IMS core network may include HSS/AAA server 325, and may manage authentication, session initiation, account information, a user profile, etc. associated with user device 205.

In some implementations, portions, or the entirety, of the LTE and/or EPC networks may represent a particular network 210, shown in FIG. 2. For example, a particular network 210 may include base station 305, SGW 310, MME 315, PGW 320, and PCRF 330. Also, in some implementations, some devices, shown in FIG. 3, may be communicatively coupled to, or may be included in the IMS core network. For example, as shown, MGW 220 and TAS 225 may be included in the IMS core network. While not shown, in some implementations, CHS 215 may also be included in the IMS core network.

Base station 305 may include one or more network devices that receive, process, and/or transmit traffic, such as calls, audio, video, text, television programming content, and/or other data, destined for and/or received from user device 205. In one example, base station 305 may be an eNB device and may be part of the LTE network. Base station 305 may receive traffic from and/or send traffic to PDN 335 via SGW 310 and PGW 320. Base station 305 may send traffic to and/or receive traffic from user device 205 via an air interface.

SGW 310 may include one or more network devices that gather, process, search, store, and/or provide information. For example, SGW 310 may include a gateway, a router, a modem, a switch, a firewall, a network interface card ("NIC"), a hub, a bridge, a proxy server, or some other type of device that processes and/or transfers traffic. SGW 310 may, for example, aggregate traffic received from one or more base stations 305 and may send the aggregated traffic to PDN 335 and/or another network via PGW 320. SGW 310 may also aggregate traffic received from PDN 335 and/or another network (e.g., via PGW 320) and may send the aggregated traffic to user device 205 via one or more base stations 305.

MME 315 may include one or more computation and communication devices that gather, process, search, store, and/or provide information. For example, MME 315 may perform operations to register user device 205 with the EPS, to establish bearer channels associated with a session with user device 205, to hand off user device 205 from the EPS to another network, to hand off user device 205 from the other network to the EPS, and/or to perform other operations. MME 315 may perform policing operations on traffic destined for and/or received from user device 205.

PGW 320 may include one or more network devices, or other types of computation and communication devices, that gather, process, search, store, and/or provide information in a manner described herein. For example, PGW 320 may include a gateway, a router, a modem, a switch, a firewall, a NIC, a hub, a bridge, a proxy server, an optical add-drop multiplexer ("OADM"), and/or some other type of device that processes and/or transfers traffic. PGW 320 may aggregate traffic received from one or more SGWs 310, and may send the aggregated traffic to PDN 335. PGW 320 may also, or alternatively, receive traffic from PDN 335 and may send the traffic toward user device 205 via SGW 310, and/or base station 305.

HSS/AAA server 325 may include one or more server devices, or other types of devices, that gather, process, search, store, and/or provide information. For example, HSS/AAA server 325 may manage, update, and/or store, in a memory associated with HSS/AAA server 325, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. Additionally, or alternatively, HSS/AAA server 325 may perform authentication, authorization, and/or accounting operations associated with the subscriber and/or a communication session with user device 205.

PCRF 330 may include one or more server devices, or other types of devices, that aggregate information to and from the EPC network and/or other sources. PCRF 330 may receive information regarding policies and/or subscriptions from one or more sources, such as subscriber databases and/or from one or more users (such as, for example, an administrator associated with PCRF 330).

PDN 335 may include one or more wired and/or wireless networks. For example, PDN 335 may include a wide area network ("WAN"), a metropolitan area network ("MAN"), the Internet, a fiber optic-based network, and/or a combination of these or other types of networks. In some implementations, PDN 335 may be communicatively coupled to one or more other networks.

Figure 4:
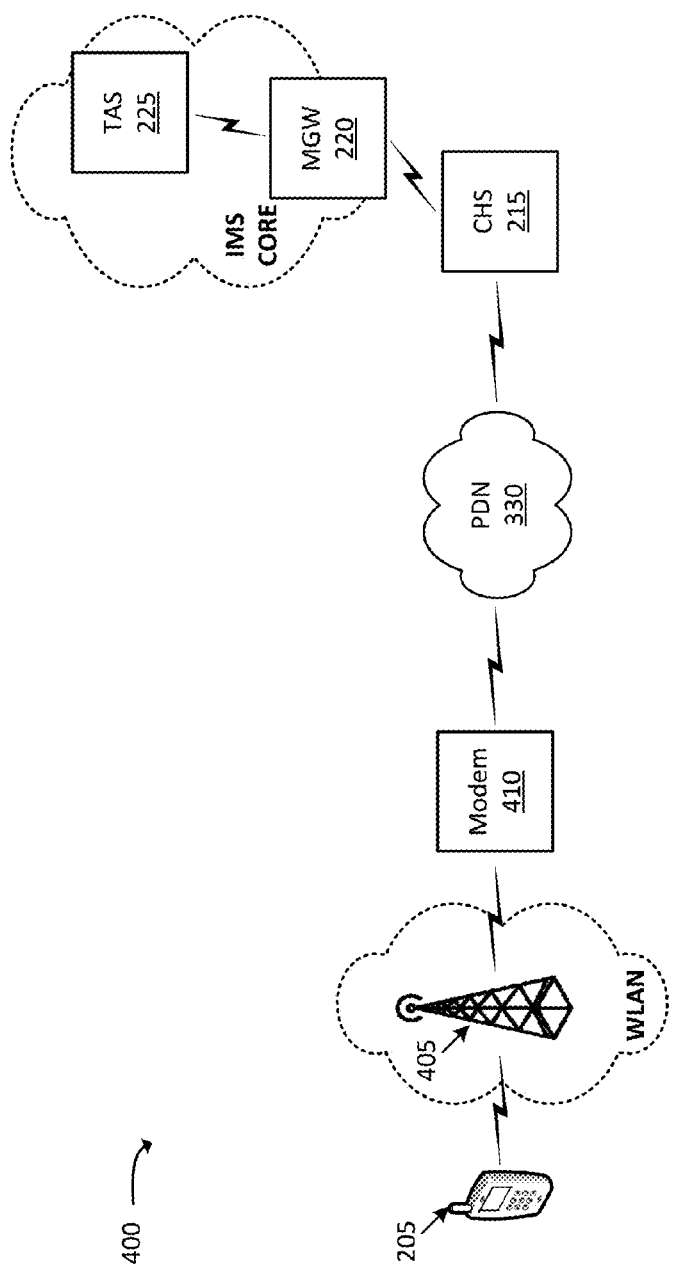

FIG. 4 illustrates environment 400, in which systems and/or methods described herein may be implemented. As mentioned above, some portions of environment 400 may be the same as, or similar to, portions of environment 200. Further, as described below, some portions of environment 400 may be more detailed representations of portions of environment 200.

As shown in FIG. 4, environment 400 may include user device 205, CHS 215, MGW 220, TAS 225, wireless LAN ("WLAN") access point 405, modem 410, and PDN 335.

The quantity of devices and/or networks, illustrated in FIG. 4, is provided for explanatory purposes only. In practice, environment 400 may include additional devices and/or networks; fewer devices and/or networks; different devices and/or networks; or differently arranged devices and/or networks than illustrated in FIG. 4. Alternatively, or additionally, one or more of the devices of environment 400 may perform one or more functions described as being performed by another one or more of the devices of environments 400.

Environment 400 may include a wireless LAN ("WLAN"), which may be implemented as, for example, a "Wi-Fi" network. For example, the WLAN may implement one or more Institute of Electrical and Electronics Engineers ("IEEE") 802.11 standards (e.g., 802.11a, 802.11b, 802.11g, 802.11n, 802.11ac, etc.). The WLAN may be, for example, a home wireless network, a pay-per-use wireless network (e.g., as deployed in an airport or another public place), or another type of wireless network. The WLAN may allow user device 205 to connect to other devices that are connected to the WLAN, and/or to one or more other networks (e.g., PDN 330).

In some implementations, portions, or the entirety, of the LTE and/or EPC networks may represent a particular network 210, shown in FIG. 2. For example, a particular network 210 may include WLAN access point 405 and modem 410.

WLAN access point 405 may include one or more network devices that receive, process, and/or transmit traffic. WLAN access point 405 may send traffic to and/or receive traffic from user device 305 via an air interface (e.g., according to an IEEE 802.11 standard). For instance, WLAN access point 405 may receive traffic from TAS 225 (e.g., via PDN 330 and modem 410), and may output the received traffic to user device 205 via the air interface. Similarly, WLAN access point 405 may receive traffic from user device 205, and may output the traffic to TAS 225 (e.g., via PDN 330 and modem 410).

Modem 410 may include one or more network devices that received, process, and/or transmit traffic. For instance, modem 410 may allow WLAN access point 405 to communicate with PDN 335. For example, modem 410 may send and/or receive traffic, associated with WLAN access point 405, to and/or from PDN 330. Although not illustrated, traffic communicated between WLAN access point 405 and modem 410 may traverse one or more routers. While referred to as a "modem" herein, modem 410 may also be referred to in some implementations as a "gateway" and/or as another device that allows WLAN access point 405 to communicate with PDN 330.

Figure 5:
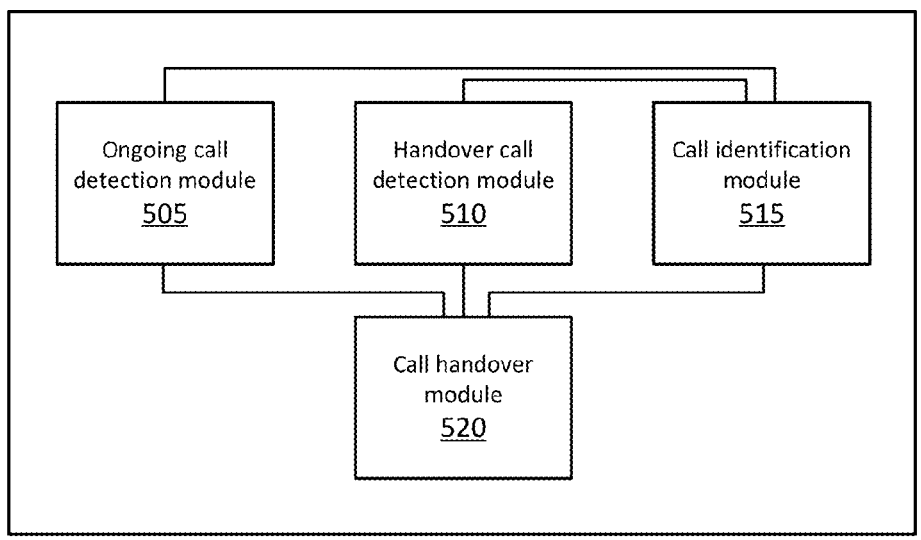
FIG. 5 illustrates example components of a call handover server, according to some implementations.

FIG. 5 illustrates example functional components of CHS 215, according to one or more implementations. CHS 215 may include, for example, ongoing call detection module 505, handover call detection module 510, call identification module 515, and call handover module 520. In other implementations, CHS 215 may include additional, fewer, different, and/or differently arranged devices. Furthermore, the functionality of one component may be performed by multiple components, and/or the functionality of multiple components may be performed by one component.

Ongoing call detection module 505 may detect calls that are placed by user device 205, and may store information regarding ongoing calls associated with user device 205. For example, ongoing call detection module 505 may receive signaling information (e.g., SS7, SIP, or other signaling information), indicating that a call has been placed by user device 205 and/or to user device 205. Ongoing call detection module 505 may also receive signaling information indicating that a call, associated with user device 205, has ended. In this manner, ongoing call detection module 505 may maintain information indicating ongoing calls associated with user device 205. That is, for instance, when a call associated with user device 205 is established, ongoing call detection module 505 may store information indicating that user device 205 is involved in an ongoing call. When the call ends, ongoing call detection module 505 may store information indicating that user device 205 is no longer involved in the call.

In some implementations, ongoing call detection module 505 may store information identifying the ongoing call. For example, ongoing call detection module 505 may store one or more bearer identifiers associated with the ongoing call (e.g., an identifier of a bearer associated with the LTE and/or EPC network). In some implementations, the information identifying the ongoing call may include a call identifier assigned during call setup. For example, as described below, when a call is being established, ongoing call detection module 505 may assign a call identifier to the call, and may subsequently use the call identifier to identify the ongoing call. In some implementations, ongoing call detection module 505 may provide the call identifier to user device 205.

Handover call detection module 510 may detect handover calls placed by user device 205. For example, handover call detection module 510 may receive signaling information, indicating that a call has been placed by user device 205. User device 205 may detect that the call is a handover call based on, for example, a telephone number to which the call is directed. That is, in some implementations, handover call detection module 510 may maintain information indicating one or more telephone numbers that are associated with handover calls, and calls placed to the one or more numbers may be considered to be handover calls. In some implementations, the handover call may include information identifying user device 205, such as a telephone number associated with user device 205, an IP address, and/or other identifying information. In some implementations, the handover call may include call identifier information (e.g., a call identifier associated with an ongoing call, provided by ongoing call detection module 505 during call setup).

Call identification module 515 may identify ongoing calls that are associated with handover calls. For example, when a handover call is identified by handover call detection module 510, call identification module 515 may identify an associated ongoing call (detected by ongoing call detection module 505). For example, when the handover call includes a call identifier, call identification module 515 may compare the call identifier, associated with the handover call, to call identifiers assigned to ongoing calls. In some implementations, call identification module 515 may compare an identifier of user device 205, from which the handover call was placed (e.g., a telephone number, an IP address, etc.), to identifiers of user devices 205 involved in ongoing calls (e.g., as detected by ongoing call detection module 505). In some implementations, call identification module 515 may use one or more other techniques to associate handover calls with ongoing calls.

Call handover module 520 may control the handover of ongoing calls from one network to another, based on call identification module 515 identifying handover calls that are associated with handover calls. For example, as described below, call handover module 520 may, in some implementations, send a handover instruction to user device 205, instructing user device 205 to hand over the ongoing call to the handover call. For example, if the ongoing call is conducted over an LTE network, and the handover call is conducted over a 1× network, call handover module 520 may instruct user device 205 to hand over the call to the 1× network. That is, the instruction may cause user device 205 to send and/or receive call traffic via a wireless radio associated with the 1× network, instead of via a wireless radio associated with the LTE network. The instruction may, in some implementations, cause user device 205 to terminate (or "hang up") the initial call via the LTE network, may place the call on hold, etc.

Call handover module 520 may also cause CHS 215, MGW 220, and/or another device to hand over the call. In some implementations, call handover module 520 may cause CHS 215, MGW 220, etc., to hand over the call based on determining that user device 205 has handed the call over. For instance, user device 205 may determine that user device 205 has handed the call over based on receiving an indication, from user device 205, that user device 205 has handed the call over. As another example, user device 205 may determine that CHS 215, MGW 220, etc. should hand the call over when call handover module 520 instructs user device 205 to hand the call over. When causing CHS 215, MGW 220, etc. to hand the call over, call handover module 520 may cause CHS 215, MGW 220, etc. to process call traffic via the handover call, in lieu of via the original call. For instance, continuing with the above example, upon receiving an instruction to hand the call over, MGW 220 may forward call traffic received via the 1× network, in lieu of forwarding (or attempting to forward) call traffic received via the LTE network. Further, MGW 220 may forward call traffic to user device 205 via the 1× network instead of via the LTE network. In some implementations, MGW 220 may terminate the initial call via the LTE network, may place the call on hold, etc.

Figure 6:
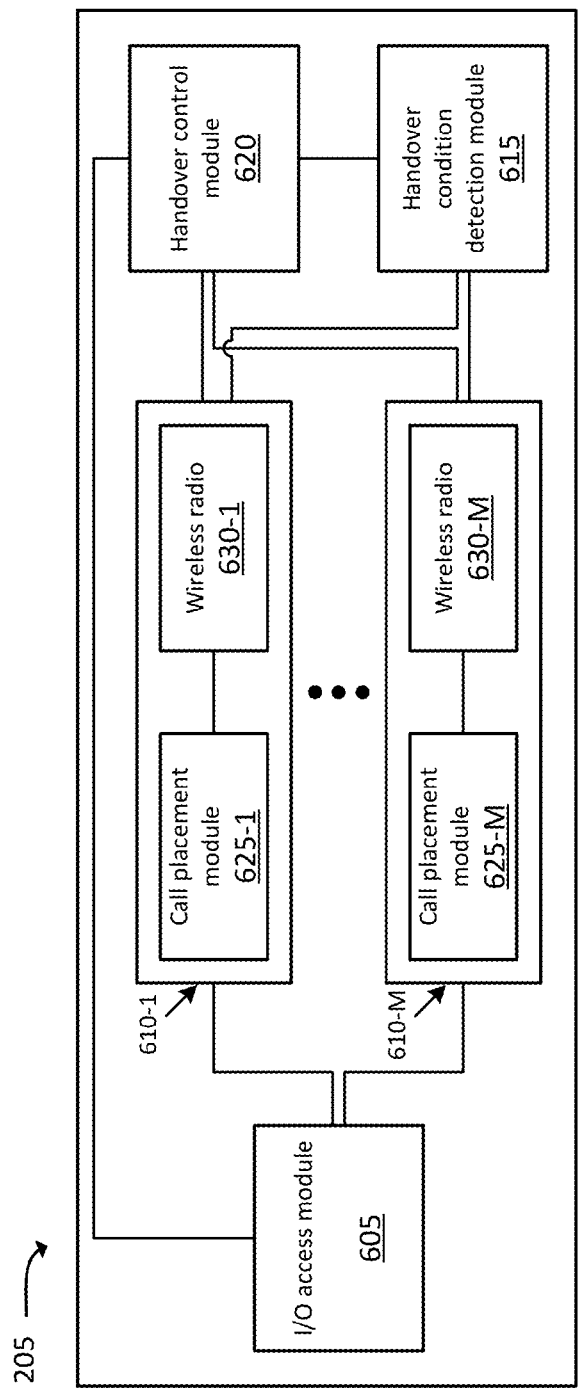
FIG. 6 illustrates example components of a user device, according to some implementations.

FIG. 6 illustrates example functional components of user device 205, in accordance with some implementations. User device 205 may include, for example, input/output ("I/O") access module 605, call leg portions 610-1 through 610-M (hereinafter sometimes referred to collectively as "call leg portions 610" or individually as "call leg portion 610," where M is an integer greater than 1), handover condition detection module 615, and handover control module 620. As shown, call leg portion 610 may include call placement module 625 and wireless radio 630. In other implementations, CHS 215 may include additional, fewer, different, and/or differently arranged devices. Furthermore, the functionality of one component may be performed by multiple components, and/or the functionality of multiple components may be performed by one component.

I/O access module 605 may control the forwarding of data provided to and from I/O devices associated with user device 205, such as an audio input device (e.g., a microphone), an audio output device (e.g., a speaker, a set of headphones, etc.), a video input device (e.g., a camera), a video output device (e.g., a display screen), etc. For example, I/O access module 605 may cause audio data, captured by a microphone associated with user device 205, to be provided to a particular call leg portion 610. As another example, I/O access module 605 may cause audio data, provided by a particular call leg portion 610, to be provided to a speaker associated with user device 205. In some implementations, I/O access module 605 may cause audio and/or video data, captured at user device 205, to be provided to one particular call leg portion 610, while causing audio and/or video data, provided by a different call leg portion 610, to be outputted by user device 205. In some implementations, call leg portion 610 may simultaneously output audio and/or video, captured at user device 205, to multiple call leg modules 610.

As described below, I/O access module 605 may determine to which call leg modules 610 audio and/or video should be provided, based on information received from handover control module 620. Similarly, I/O access module 605 may determine from which call leg modules 610 audio and/or video should be outputted, based on information received from handover control module 620. Briefly, the information provided by handover control module 620 may indicate when a call handover should be performed, from which call leg portion 610 the handover should be performed, and to which call leg portion 610 the handover should be performed.

Call leg portion 610 may conceptually correspond to a portion of user device 205 that communicates with a particular wireless network, in order to conduct a call session via the particular wireless network. For example, a first call leg portion 610 may be used to conduct calls via an LTE network, a second call leg portion 610 may be used to conduct calls via a 1× network, a third call leg portion 610 may be used to conduct calls via a Wi-Fi network, and so on. Call leg portion 610 may receive audio and/or video from I/O access module 605 and may output the audio and/or video to a respective wireless network. Similarly, call leg portion 610 may receive audio and/or video from a particular wireless network and may provide the audio and/or video to I/O access module 605. In some implementations, a particular call leg portion 610 (or portions of call leg portion 610) may be disabled, powered down, or in a low-power state when the particular call leg portion 610 is not being used to conduct a call. On the other hand, a particular call leg portion 610 (or portions of call leg portion 610) may be enabled, powered on, or in a high- or normal-power state when the particular call leg portion 610 is being used to place or conduct a call.

As mentioned above, call leg portion 610 may include call placement module 625 and wireless radio 630. Call placement module 625 may place a call in response to, for example, a request by a user of user device 205. Additionally, or alternatively, call placement module 625 may place a call (e.g., a handover call) based on a handover instruction provided by handover control module 620 and/or another source (e.g., without a request by a user of user device 205). Wireless radio 630 may communicate, via a wireless interface, with a particular wireless network (e.g., a base station or access point of a particular wireless network). For example, wireless radio 630 may send and/or receive call traffic via a corresponding wireless network.

Handover condition detection module 615 may detect a handover condition in one or more wireless networks. For example, handover condition detection module 615 may detect a handover condition in a wireless network via which an ongoing call is currently being conducted. In some implementations, handover condition detection module 615 may monitor performance metrics or other information associated with the wireless network, via which the ongoing call is currently being conducted. For example, handover condition detection module 615 may periodically or intermittently monitor a measure of uplink and/or downlink throughput, a measure of uplink and/or downlink latency, a measure of packet jitter, a signal-to-noise ratio, a measure of packet loss, and/or other information pertaining to the wireless network. In some implementations, handover condition detection module 615 may periodically or intermittently monitor performance metrics or other information associated with one or more other wireless networks, such as wireless networks of which user device 205 is in range but is not currently conducting an active call. In some implementations, handover condition detection module 615 may detect a handover condition in a particular wireless network by sending test packets via the particular wireless network, monitoring traffic associated with an ongoing call, receive performance information or other information regarding the particular wireless network from another source, or using another technique.

Handover control module 620 may cause user device 205 to hand over an ongoing call based on, for example, a handover condition detected by handover condition detection module 615. For example, handover control module 620 may instruct a particular call leg portion 610, which is not involved in a call, to place a handover call. Handover control module 620 may also instruct I/O access module 605 to send and/or receive call traffic to and/or from a particular call leg portion 610, to which the call should be handed over. In some implementations, handover control module 620 may instruct I/O access module 605 to cease sending and/or receiving call traffic to and/or from a particular call leg portion 610, from which the call should be handed over. Examples of handover control operations, that may be performed by handover control module 620, are described below in greater detail.

Figure 7:
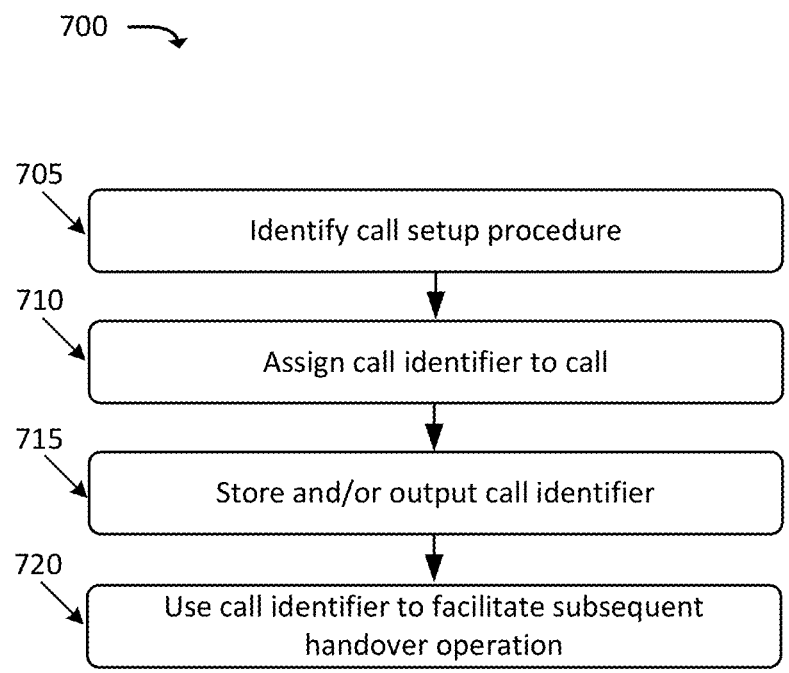
FIG. 7-10 illustrate example processes for performing a call handover.
Figure 8:
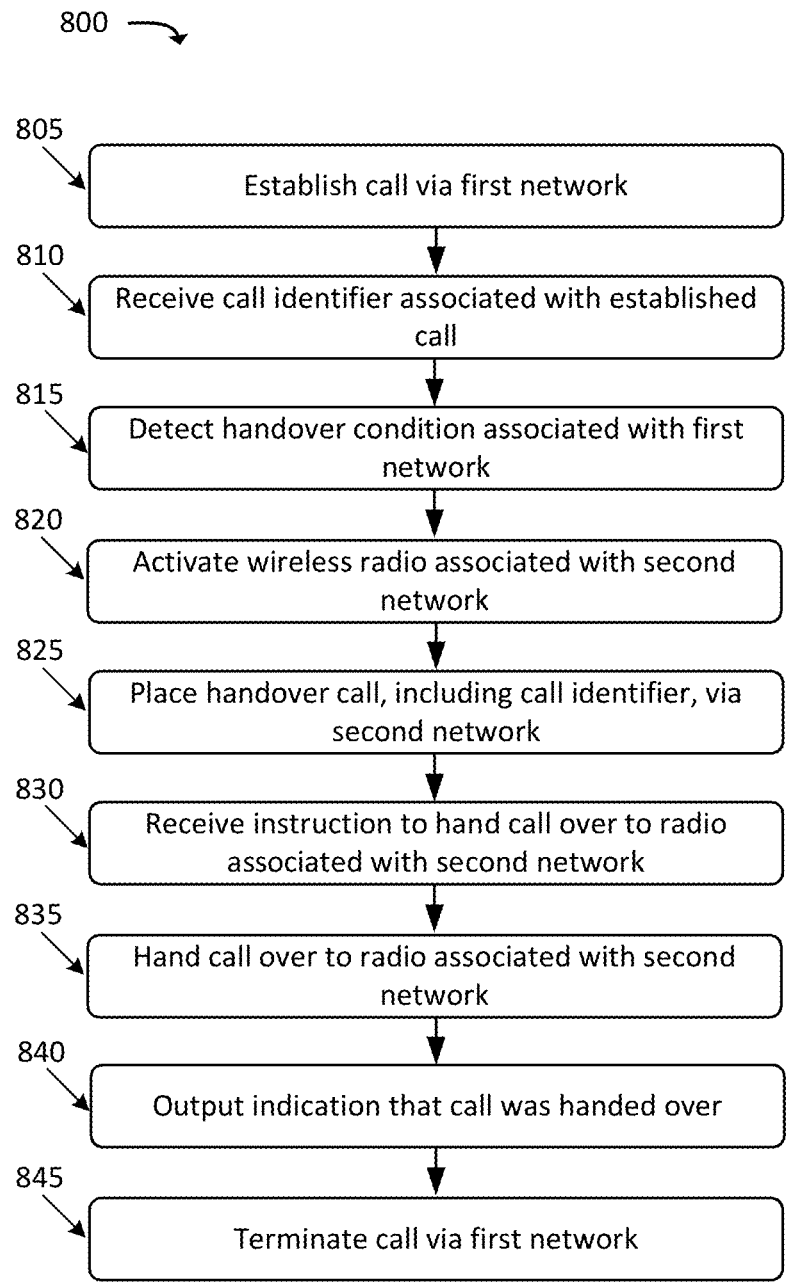

FIGS. 7-10 illustrate example processes 700, 800, 900, and 1000 for performing a call handover, in accordance with one or more implementations. For example, FIGS. 7 and 8 illustrate example processes 700 and 800 for performing a call handover using a call identifier. In one example implementation, process 700 may be performed by CHS 215. In other implementations, some or all of process 700 may be performed by one or more other devices in lieu of, or in conjunction with, CHS 215.

Process 700 may include identifying a call setup procedure (block 705). For example, as described above with respect to ongoing call detection module 505, CHS 215 may receive signaling information (e.g., SS7 signaling information, SIP signaling information, etc.), or other information indicating that a call is being set up for (e.g., being placed by or being placed to) a particular user device 205. When identifying the call setup procedure, CHS 215 may identify an identifier associated with user device 205 (e.g., a telephone number, an IP address, an International Mobile Equipment Identity ("IMEI") number, an International Mobile Subscriber Identity ("IMSI") number, and/or another identifier). In some implementations, when identifying the call setup procedure, CHS 215 may identify an identifier associated with one or more bearer channels, via which the call is placed. For example, the bearer channels may correspond to bearer channels of an LTE network and/or an EPC network, when the call is placed via an LTE network. User device 205 may store some or all of the information identifying user device 205 and the one or more bearer channels associated with the call.

Process 700 may also include assigning a call identifier to the call (block 710). For example, as also described above with respect to ongoing call detection module 505, CHS 215 may associate the identified call with a call identifier. For example, CHS 215 may generate a random number and/or character sequence that uniquely identifies the call, may identify an unused identifier from a pool of identifiers, and/or may otherwise generate an identifier that may be used to uniquely identify the call.

Process 700 may further include storing and/or outputting the call identifier (block 715). For example, CHS 215 may store the call identifier in a manner that indicates that the call identifier is associated with the call. For example, CHS 215 may store the call identifier in a data structure, in a manner that associates the call identifier with the information identifying user device 205, the one or more bearer channels, etc. CHS 215 may also output the call identifier to user device 205 and/or to another device. For example, CHS 215 may output the call identifier to user device 205 via a bearer channel associated with the established call, via a different bearer channel on the wireless network associated with the established call, and/or via a different network.

Process 700 may additionally include using the call identifier to facilitate a subsequent handover operation (block 720). For example, as described above with respect to handover call detection module 510, call identification module 515, and call handover module 520, CHS 215 may receive a handover call, including the call identifier. CHS 215 may match the handover call to the established call (identified at block 705), and may cause a handover to be performed from the established call to the handover call. Examples of how the handover may be performed, in accordance with some implementations, are provided in greater detail below.

As mentioned above, FIG. 8 illustrates an example process 800 for performing a handover, using a call identifier. In one example implementation, process 800 may be performed by user device 205. In other implementations, some or all of process 800 may be performed by one or more other devices in lieu of, or in conjunction with, user device 205.

Process 800 may include establishing a call via a first network (block 805). For example, as described above with respect to call leg portion 610, user device 205 may place a call (e.g., a voice call, a video call, etc.) via a wireless network, such as an LTE network, a 1× network, a Wi-Fi network, etc.

Process 800 may also include receiving a call identifier associated with the established call (block 810). For example, user device 205 may receive a call identifier from CHS 215, as described above. User device 205 may store the call identifier for later use when detecting that a handover should be performed. In some implementations, CHS 215 may be configured to perform handovers without using a call identifier. In some such implementations, user device 205 may not receive (at block 810) a call identifier from CHS 215.

Process 800 may further include detecting a handover condition associated with the first network (block 815). For example, as described above with respect to handover condition detection module 615, user device 205 may detect a handover condition in the first network, based on performance metrics or other information (e.g., throughput, latency, jitter, packet loss, signal-to-noise ratio, and/or other information). In some implementations, a handover condition may be detected based on user device 205 moving from one cell (e.g., coverage area associated with a base station or access point) to another cell. In other implementations, the detection of a handover condition may be independent (e.g., not based on) user device 205 moving from one cell to another cell.

Process 800 may additionally include activating a wireless radio associated with a second network (block 820). For example, user device 205 may switch a particular wireless radio 630, associated with a second network, from an off state or a low-power state, to an on state or a high- or normal-power state. In some implementations, the wireless radio associated with the second network may already be activated. For example, the wireless radio may have been previously activated in order to determine whether the second network is available. As another example, the wireless radio may not have previously been in an off state or a low-power state. In some such implementations, user device 205 may forgo performing block 820.

Process 800 may also include placing a handover call, including the call identifier, via the second network (block 825). For example, user device 205 may place a call via the wireless radio activated at block 820. When placing the handover call, user device 205 may call a telephone number that has been previously designated as a number associated with handover calls. In some implementations, user device 205 may include the call identifier, received at block 810, when placing the handover call. For example, the call identifier may be included in the signaling of the call, and/or may be provided after the call has been established.

Process 800 may further include receiving an instruction to hand the call over to the radio associated with the second network (block 830). For example, user device 205 may receive an instruction from CHS 215, indicating that the call should be handed over. As mentioned above, the instruction may be received via the first network, the second network, or via another network.

Process 800 may additionally include handing the call over to the radio associated with the second network (block 835). For example, as described above with respect to handover control module 620, user device 205 may hand the call over to the second network. For instance, I/O access module 605 may cause audio and/or video, captured at user device 205, to be provided to the wireless radio associated with the second network. Further, I/O access module 605 may process incoming audio and/or video, received via the second network.

Process 800 may also include outputting an indication that the call was handed over (block 840). For example, after handing over the call, user device 205 may output an indication, to CHS 215, indicating that the call was handed over. User device 205 may output the indication via the second network and/or another network.

Process 800 may further include terminating the call via the first network (block 845). For example, user device 205 may place the original call on hold, and/or may terminate (e.g., "hang up") the call.

Figure 9:
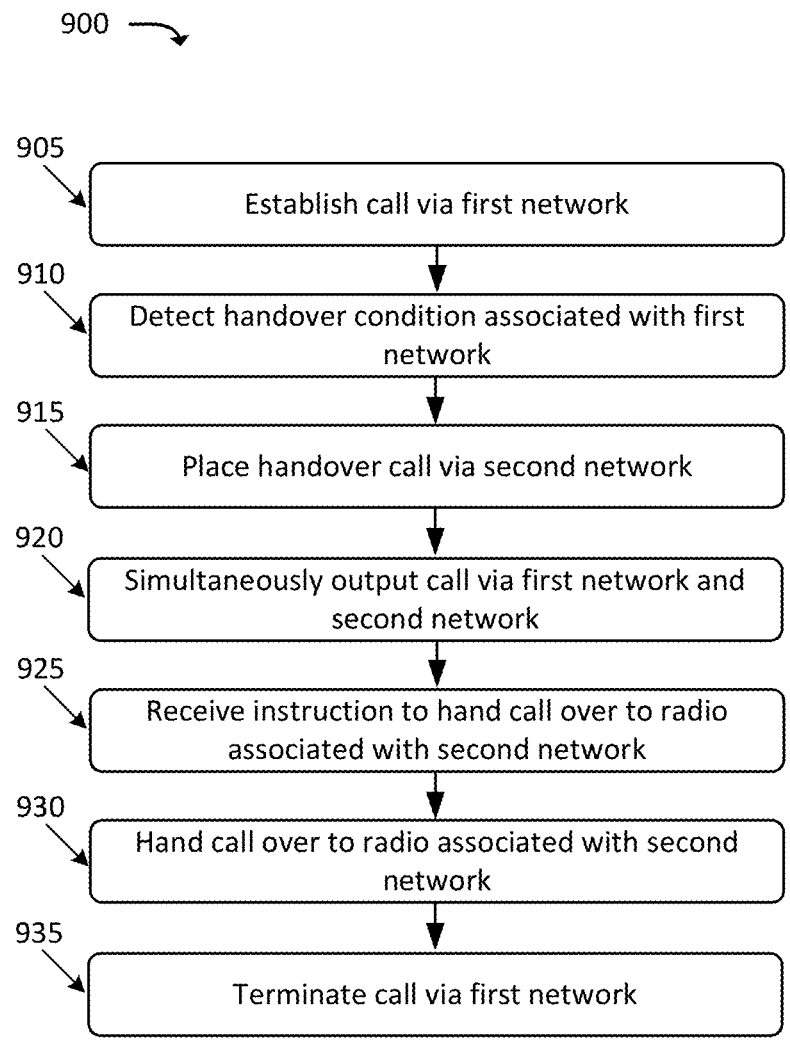

FIG. 9 illustrates another example process 900 for performing a handover. In one example implementation, process 900 may be performed by user device 205. In other implementations, some or all of process 900 may be performed by one or more other devices in lieu of, or in conjunction with, user device 205. Some portions of process 900 may be the same as, or similar to, portions of process 800, described above. For the sake of brevity, these portions are not described again in detail below.

Process 900 may include establishing a call via a first network (block 905). Process 900 may further include detecting a handover condition associated with the first network (block 910). Process 900 may also include placing a handover call via a second network (block 915).

Process 900 may additionally include simultaneously outputting the call via the first network and the second network (block 920). For example, as described above with respect to I/O access module 605 and call leg portion 610, user device 205 may output simultaneously output audio and/or video traffic, associated with the call, via the first network and the second network (e.g., via the calls established at blocks 905 and 915, respectively). At this point, while simultaneously outputting call traffic via the first network and the second network, user device 205 may still be receiving call traffic via the first network (e.g., I/O access module 605 may be processing audio and/or video traffic received via the first network). In some implementations, although not shown in this figure, user device 205 may output a notification to CHS 215, indicating that user device 205 is simultaneously outputting call traffic via the first network and the second network.

Process 900 may further include receiving an instruction to hand over the call to a radio associated with the second network (block 925). For example, user device 205 may receive an instruction from CHS 215, instructing user device 205 to hand the call over to the second network. As discussed below, CHS 215 may output the instruction to user device 205 based on detecting call traffic via the second network, and/or based on a notification provided by user device 205 to CHS 215.

Process 900 may additionally include handing the call over to the radio associated with the second network (block 930). Process 900 may further include terminating the call via the first network (block 935). For example, user device 205 may place the original call on hold, and/or may terminate (e.g., "hang up") the call.

Figure 10:
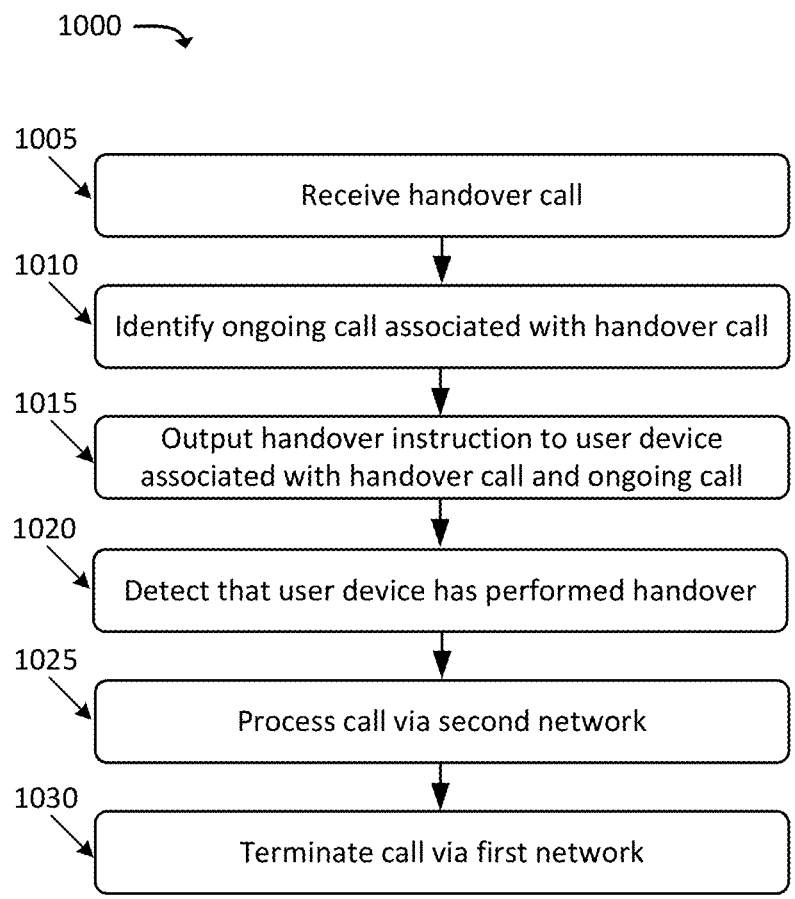

FIG. 10 illustrates another example process 1000 for performing a handover. In one example implementation, process 1000 may be performed by CHS 215. In other implementations, some or all of process 1000 may be performed by one or more other devices in lieu of, or in conjunction with, CHS 215. Some portions of process 900 may be the same as, or similar to, portions of process 1000, described above. For the sake of brevity, these portions are not described again in detail below.

Process 1000 may include receiving a handover call (block 1005). For example, as described above with respect to handover call detection module 510, CHS 215 may receive a handover call from user device 205, and/or may receive an indication (e.g., signaling information) that a handover call has been placed. The handover call may, in some implementations, be a call to a particular telephone number associated with performing handovers. The handover call may include information identifying user device 205, a call identifier identifying an ongoing call associated with user device 205, and/or other information.

Process 1000 may also include identifying an ongoing call associated with the handover call (block 1010). For example, as described above with respect to ongoing call detection module 505, CHS 215 may identify an ingoing call that is associated with the handover call. For instance, CHS 215 may use information received or extracted from the handover call (received at block 1005) to identify an ongoing call that is currently taking place. As also mentioned above, the ongoing call may be conducted via a different network than the handover call.

Process 1000 may additionally include outputting a handover instruction to a user device associated with the handover call and the ongoing call (block 1015). For instance, CHS 215 may output an instruction to user device 205 to hand over the ongoing call to the handover call. In some implementations, CHS 215 may forgo outputting (at block 1015) the instruction to user device 205. In some such implementations, user device 205 may output call traffic simultaneously via the ongoing call and the handover call, in a manner similar to that described above with respect to block 920 of FIG. 9.

Process 1000 may further include detecting that the user device has performed a handover (block 1020). For example, CHS 215 may receive a notification from user device 205, indicating that user device 205 has performed a handover from the ongoing call to the handover call. Additionally, or alternatively, CHS 215 may monitor the handover call for call traffic (e.g., determine whether audio and/or video traffic is received via the handover call), and may detect that user device 205 has performed the handover when detecting that call traffic has been received via the handover call.

Process 1000 may also include processing the call via the second network (block 1025). For example, CHS 215 may forward call traffic, received via the handover call, to one or more other devices (e.g., MGW 220, TAS 225, and/or another device) for subsequent processing. Additionally, or alternatively, CHS 215 may send an instruction to one or more other devices (e.g., MGW 220, TAS 225, and/or another device) to process the call traffic, received via the handover call. In some implementations, when processing call traffic received via the handover call, CHS 215, MGW 220, TAS 225, and/or another device may cease processing (or attempting to process) call traffic received via the original ongoing call.

Process 1000 may additionally include terminating the call via the first network (block 1030). For example, CHS 215 may terminate (or "hang up") the original ongoing call. Additionally, or alternatively, CHS 215 may instruct another device (e.g., MGW 220, TAS 225, and/or another device) to terminate the call.

Figure 11:
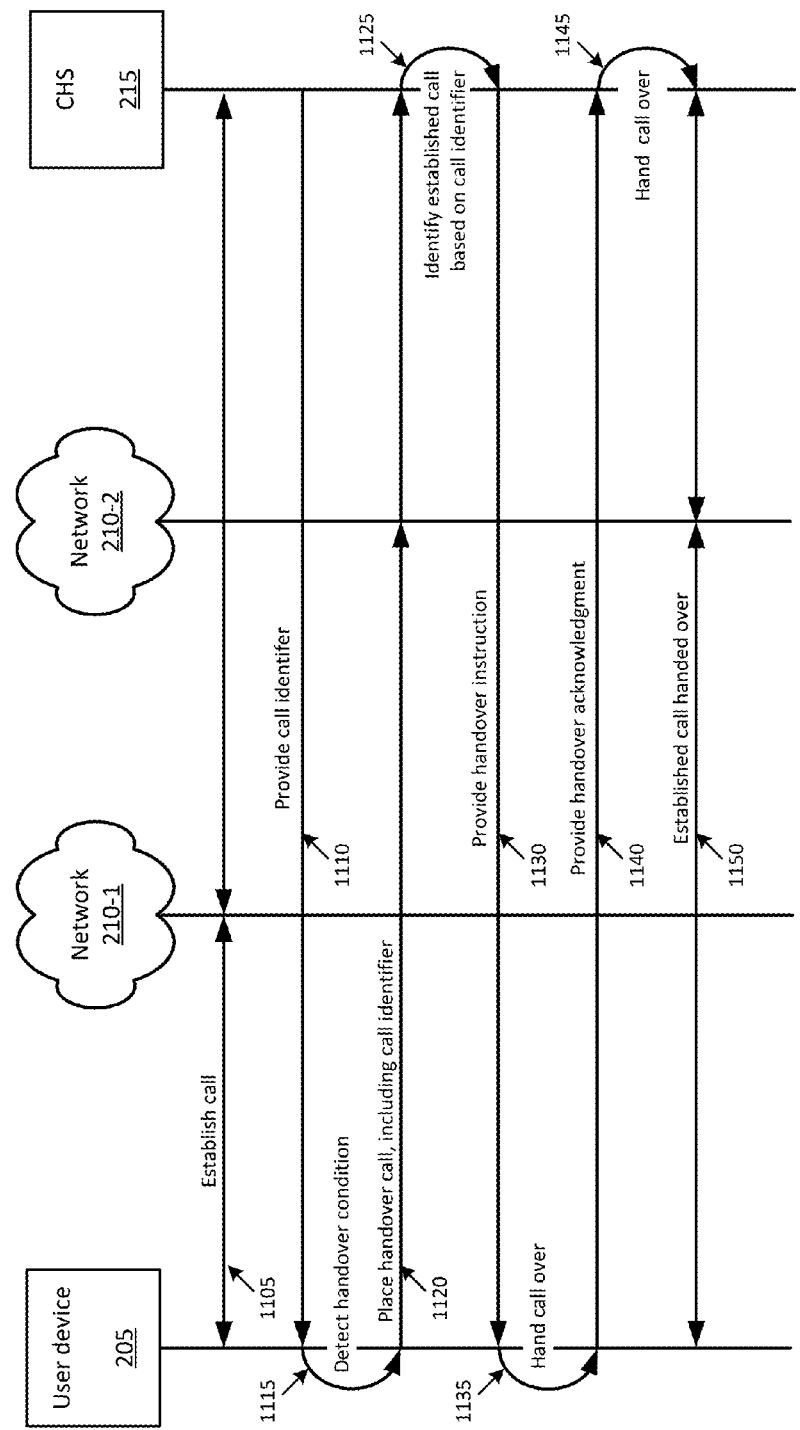
FIGS. 11 and 12 illustrate example signal flows for performing a call handover.
Figure 12:
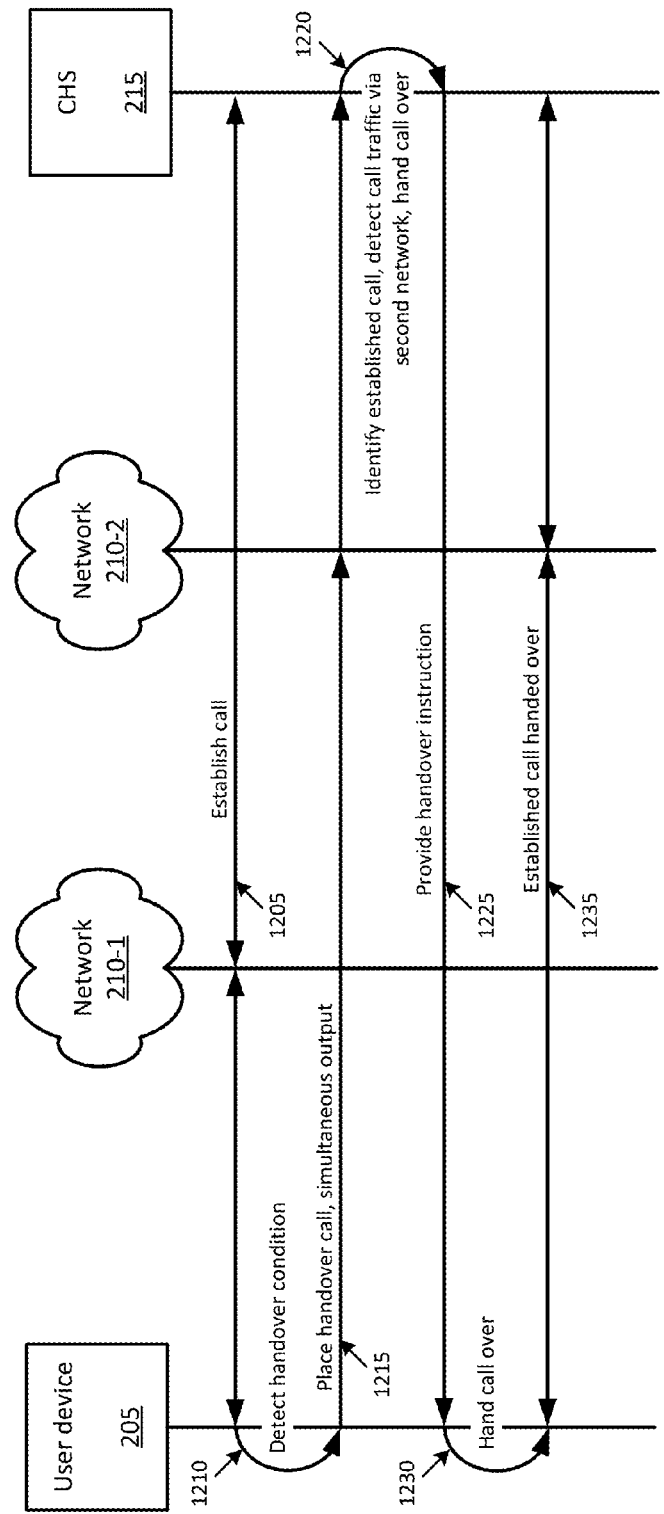

FIGS. 11 and 12 illustrate example signal flows of call handovers using techniques similar to those described above. FIG. 11, for example, illustrates an implementation in which a call handover is performed using a call identifier, and based on an instruction from CHS 215 to user device 205 to hand over a call. FIG. 12 illustrates an implementation in which a call handover is performed without using a call identifier, and without an instruction from CHS 215 to user device 205 (e.g., based on a detection by CHS 215 that user device 205 is sending call traffic via a handover call). In some implementations, various aspects of these implementations may be changed or omitted. For instance, while not shown, some implementations may include performing a call handover without using a call identifier, and based on an instruction from CHS 215 to user device 205 to hand over the call. As another example, while also not shown, some implementations may include performing a call handover using a call identifier, and without an instruction from CHS 215 to user device 205. In practice, other implementations may be possible.

As shown in FIG. 11, user device 205 may establish (at 1105) a call via network 210-1. As part of the establishment of the call CHS 215 may be notified of the call and/or may be involved in the establishment of the call (e.g., may receive and/or perform signaling, including SS7 signaling, SIP signaling, and/or other signaling). Based on detecting the establishment of the call, CHS 215 may output (at 1110) a call identifier, associated with the call, to user device 205. As discussed above, CHS 215 may provide the call identifier via network 210-1 and/or another network.

During the call, user device 205 may detect (at 1115) a handover condition (e.g., based on performance metrics and/or other information associated with network 210-1). Additionally, although not shown, user device 205 may determine that network 210-2 is available, and/or that network 210-2 may provide higher quality service than network 210-1 (e.g., higher throughput, lower latency, less packet loss, higher signal-to-noise ratio, etc.). Based on detecting the handover condition, user device 205 may place (at 1120)

a handover call to a designated handover number, via network 210-2. In some implementations, the handover call may include the call identifier (e.g., the call identifier may be provided during call setup and/or after the handover call is established).

CHS 215 may identify (at 1125) the established call (established at 1105) based on the call identifier and/or based on other information. Upon identifying that the handover call (placed at 1120) is associated with the established call, CHS 215 may output (at 1130) a handover instruction to user device 205. User device 205 may hand the call over (at 1135) from the established call to the handover call based on receiving the handover instruction. For example, as described above, user device 205 may output call traffic via a radio associated with network 210-2, based on receiving the handover instruction. User device 205 may also provide (at 1140) a handover acknowledgement to CHS 215, indicating that user device 205 has performed the handover. The handover acknowledgment may be provided via network 210-1, network 210-2, and/or another network.

Based on receiving the handover acknowledgment, CHS 215 may hand the call over (at 1145). For example, as discussed above, CHS 215 may process, and/or may instruct another device to process, call traffic associated with user device 205 via network 210-2 instead of via network 210-1. Once user device 205 and CHS 215 have performed the respective handover operations (at 1135 and 1145), the call may be fully handed over to network 210-2, and may be carried on (at 1150) via network 210-2.

As shown in FIG. 12, user device 205 may establish (at 1205) a call via network 210-1. As part of the establishment of the call CHS 215 may be notified of the call and/or may be involved in the establishment of the call (e.g., may receive and/or perform signaling, including SS7 signaling, SIP signaling, and/or other signaling). During the call, user device 205 may detect (at 1210) a handover condition (e.g., based on performance metrics and/or other information associated with network 210-1). Additionally, although not shown, user device 205 may determine that network 210-2 is available, and/or that network 210-2 may provide higher quality service than network 210-1.

Based on detecting the handover condition, user device 205 may place (at 1215) a handover call to a designated handover number, via network 210-2. As described above, user device 205 may simultaneously output call traffic via the established call (established at 1205) and the handover call.

CHS 215 may identify (at 1220) the established call (established at 1205) based on information associated with the handover call and the established call (e.g., identifying information associated with user device 205). CHS 215 may also detect (at 1220) call traffic via network 210-2, and may hand over the call based on detecting the call traffic. For example, as discussed above, CHS 215 may process, and/or may instruct another device to process, call traffic associated with user device 205 via network 210-2 instead of via network 210-1.

Upon handing the call over (at 1220), CHS 215 may output (at 1225) a handover instruction to user device 205. User device 205 may hand the call over (at 1230) from the established call to the handover call based on receiving the handover instruction. For example, as described above, user device 205 may process incoming call traffic via network 210-2 instead of network 210-1. Once user device 205 and CHS 215 have performed the respective handover operations (at 1220 and 1230), the call may be fully handed over to network 210-2, and may be carried on (at 1235) via network 210-2.

Figure 13:
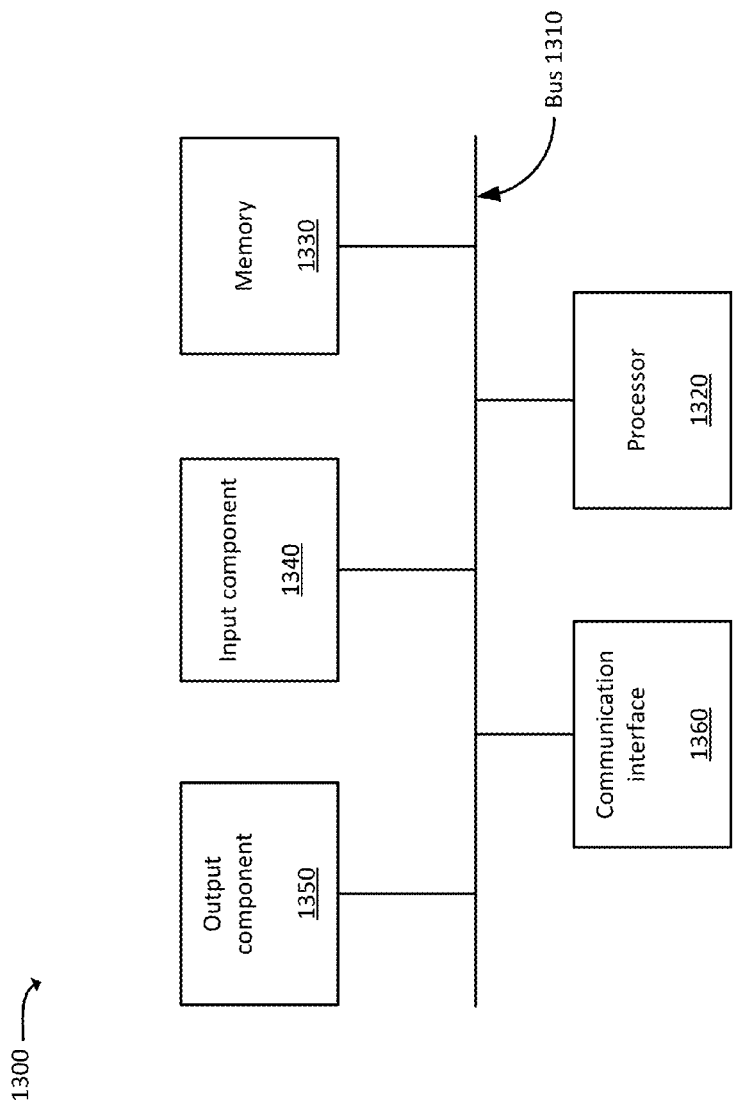
FIG. 13 illustrates example components of one or more devices, according to one or more implementations described herein.

FIG. 13 is a diagram of example components of device 1300. One or more of the devices described above (e.g., as described with respect to FIGS. 1A, 1B, 2-6, 11, and 12) may include one or more devices 1300. Device 1300 may include bus 1310, processor 1310, memory 1320, input component 1330, output component 1340, and communication interface 1360. In another implementation, device 1300 may include additional, fewer, different, or differently arranged components.

Bus 1310 may include one or more communication paths that permit communication among the components of device 1300. Processor 1310 may include a processor, microprocessor, or processing logic that may interpret and execute instructions. Memory 1320 may include any type of dynamic storage device that may store information and instructions for execution by processor 1310, and/or any type of non-volatile storage device that may store information for use by processor 1310.

Input component 1330 may include a mechanism that permits an operator to input information to device 1300, such as a keyboard, a keypad, a button, a switch, etc. Output component 1340 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1310 executing software instructions stored in a computer-readable medium, such as memory 1320. A computer-readable medium may be defined as a non-transitory memory device. A memory device may include space within a single physical memory device or spread across multiple physical memory devices. The software instructions may be read into memory 1320 from another computer-readable medium or from another device. The software instructions stored in memory 1320 may cause processor 1310 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7-10, the order of the blocks may be modified in other implementations. Further, non-dependent blocks may be performed in parallel. In some implementations, additional blocks may be performed before, after, or in between the described blocks.

Additionally, while series of signals have been described with regard to FIGS. 11 and 12, the order of the signals may be modified in other implementations. Also, non-dependent signals may be sent and/or received in parallel. In some implementations, additional signals may be transmitted before, after, or in between the described signals.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2-6), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a server device, an indication that a first call has been placed by a user device, the first call being placed via a first network and being simultaneously executed with a second call established, prior to the first call, via a second network that is different than the first network, wherein the first call has been placed by the user device based on the user device detecting a handover condition,
      wherein the user device simultaneously outputs call traffic via both the first call and the second call, the call traffic including at least one of audio call traffic or video call traffic,
      wherein detecting the handover condition includes determining that, at least one of:
         a measure of uplink throughput, of the second network, is below a threshold uplink throughput, or
         a measure of downlink throughput, of the second network, is below a threshold downlink throughput;
   identifying, by the server device, the ongoing second call in which the user device is a party, the ongoing second call being carried, while the first call is in progress, via the second network;
   outputting, by the server device, to the user device, and in response to the indication that the first call has been placed by the user device, a handover instruction, to the user device, regarding the first call and the second call;
   detecting, by the server device, that the user device, in accordance with the handover instruction, has performed a handover of the second call, from the second network to the first network, the performing of the handover including the user device processing call traffic, received via the first call, instead of processing call traffic, received via the second call, the detecting including:
      monitoring the first call for audio or video call traffic from the user device;
      detecting, based on the monitoring, that audio or video call traffic has been received via the first call, from the user device; and
   instructing, by the server device and based on the detecting that audio or video call traffic has been received via the first call, one or more devices of the of the first network to process call traffic that corresponds to the first call.

2. The method of claim 1, wherein the detecting, that the user device has performed the handover, further includes:
   receiving a notification, from the user device, indicating that the user device has performed the handover of the second call from the second network to the first network.

3. The method of claim 1, further comprising:
   detecting an establishment of the ongoing second call; and
   providing, to the user device and based on detecting the establishment of the ongoing second call, a call identifier that identifies the ongoing second call,
   wherein identifying the second call includes:
      identifying that the first call is associated with the call identifier.

4. The method of claim 3, wherein identifying that the first call is associated with the call identifier includes:
   identifying signaling, associated with the first call, that includes the call identifier.

5. The method of claim 1, wherein instructing the one or more devices of the of the first network to process the first call includes at least one of:
   instructing one or more devices of the second network to place the second call, via the second network, on hold, or
   instructing the user device to place the second call on hold.

6. The method of claim 1, wherein instructing the one or more devices of the of the first network to process the first call includes:
   instructing a media gateway device or a telephony application server device to process the first call via the first network.

7. The method of claim 1, further comprising:
receiving a notification from the user device that the user device has performed the handover based on the handover instruction,
wherein detecting that the user device has performed the handover of the second call from the second network to the first network is further based on the received notification.

8. The method of claim 1, wherein the first call, placed by the user device, is a call placed to a particular telephone number to accomplish handovers, the method further comprising:
detecting that the first call has been placed, by the user device, to the particular telephone number; and
determining that the first call is associated with the ongoing second call, by determining that the user device that placed the first call is a same user device that is participating in the second call,
wherein the identifying the second call is based on determining that the first call was placed by the same user device that is participating in the second call.

9. The method of claim 1, wherein detecting the handover condition further includes determining that:
a measure of uplink latency, of the second network, exceeds a threshold uplink latency, or
a measure of downlink latency, of the second network, exceeds a threshold downlink latency.

10. The method of claim 9, wherein detecting the handover condition further includes determining that:
a measure of packet loss, of the second network, exceeds a threshold packet loss, or
a measure of packet jitter, of the second network, exceeds a threshold packet jitter.

11. A server device, comprising:
a non-transitory memory device storing a set of processor-executable instructions; and
a processor configured to execute the processor-executable instructions, wherein executing the processor-executable instructions causes the processor to:
identify that a user device has established a second call while simultaneously engaged in a first call, the second call being established subsequent to the first call and via a second network that is different from a first network via which the first call is carried, wherein the first call has been placed by the user device based on the user device detecting a handover condition, the detecting of the handover condition including determining that, at least one of:
a measure of uplink latency, of the first network, exceeds a threshold uplink latency, or
a measure of downlink latency, of the first network, exceeds a threshold downlink latency;
output, to the user device and in response to identifying that the second call has been established, handover instructions, to the user device, regarding the first call and the second call;
detect that the user device performed a handover, in accordance with the handover instructions, of the first call from the first network to the second network, the detecting including:
monitoring the second call for call traffic from the user device;
detecting, based on the monitoring, audio or video call traffic, from the user device, via the second call; and
instruct, based on detecting audio or video call traffic via the second call, one or more devices of the of the first network to process call traffic that corresponds to the handed over first call.

12. The server device of claim 11, wherein executing the processor-executable instructions, to detect that the user device performed the handover of the first call from the first network to the second network, further causes the processor to:
receive a notification, from the user device, indicating that the user device has performed the handover of the first call from the first network to the second network.

13. The server device of claim 11, wherein executing the processor-executable instructions further causes the processor to:
detect an establishment of the first call;
provide, to the user device and based on detecting the establishment of the first call, a call identifier of the first call; and
identify that the second call is associated with the first call by identifying that the second call is associated with the call identifier.

14. The server device of claim 13, wherein executing the processor-executable instructions, to identify that the second call is associated with the call identifier, further causes the processor to:
identify signaling, associated with the second call, that includes the call identifier.

15. The server device of claim 11, wherein executing the processor-executable instructions, to instruct the one or more devices of the of the first network to process the first call, further causes the processor to:
instruct one or more devices of the second network to place the first call, via the first network, on hold, or
instruct the user device to place the first call on hold via the second network.

16. The server device of claim 11, wherein executing the processor-executable instructions, to instruct the one or more devices of the of the first network to process first call, further causes the processor to:
instruct a media gateway device or a telephony application server device to process the first call, via the second network.

17. The server device of claim 11, wherein executing the processor-executable instructions further causes the processor to:
receive a notification from the user device that the user device has performed a handover, of the first call from the first network to the second network, based on the handover instructions,
wherein detecting that the user device has performed the handover of the first call, from the first network to the second network, is further based on the received notification.

18. A method, comprising:
establishing, by a user device, a first call, via a first network;
sending and receiving, by the user device, call traffic via the first call that is established via the first network, the call traffic including at least one of audio or video call traffic;
detecting, by the user device, a handover condition of the first network, wherein detecting the handover condition includes detecting that, at least one of:
a measure of uplink throughput, of the first network, is below a threshold uplink throughput,
a measure of downlink throughput, of the first network, is below a threshold downlink throughput, a measure of uplink latency, of the first network, exceeds a threshold uplink latency,
a measure of downlink latency, of the first network, exceeds a threshold downlink latency,
a measure of packet loss, of the first network, exceeds a threshold packet loss, or
a measure of packet jitter, of the first network, exceeds a threshold packet jitter;
identifying, by the user device, a telephone number via which a call handover server can be contacted;
placing, by the user device and based on detecting the handover condition, a second call to the telephone number via a second network that is different from the first network,
  the second call being established while the first call is in progress such that the first call and the second call are active simultaneously;
continuing, by the user device and before receiving an instruction to perform a handover from the first call to the second call, to send outgoing call traffic via the first call, the outgoing call traffic including at least one of audio or video call traffic;
sending, by the user device and before receiving the instruction to perform the handover from the first call to the second call, the outgoing call traffic via the second call, such that the outgoing traffic is simultaneously sent via both the first call and the second call;
processing, by the user device and while simultaneously sending the outgoing call traffic via the first and second calls, incoming call traffic via the first call prior to receiving the instruction to perform the handover;
receiving, by the user device and from a network device, the instruction to perform the handover from the first call to the second call,
  wherein the network device monitors the second call for call traffic from the user device and outputs the instruction when detecting, based on the monitoring, call traffic from the user device via the second call; and
sending and receiving, by the user device and based on the instruction to perform the handover, subsequent call traffic via the second call instead of the first call.

19. The method of claim 18, further comprising:
outputting a notification, indicating that the handover has been performed, after beginning to send outgoing call traffic via the second call instead of the first call, wherein the notification causes the call handover server to process incoming and outgoing call traffic, via the second call, instead of the first call, based on receiving the notification.

20. The method of claim 18, further comprising:
receiving a call identifier associated with the first call,
wherein establishing the second call comprises including the call identifier in signaling associated with the second call, wherein a server device uses the call identifier, included in the signaling associated with the second call, to associate the second call with the first call.

21. The method of claim 18, wherein detecting the handover condition further includes detecting that at a measure of signal-to-noise ratio, of the first network, exceeds a threshold signal-to-noise ratio.

22. The method of claim 18, wherein the network device includes at least one of:
a media gateway device, or
a telephony application server device.

\* \* \* \* \*